United States Patent

[11] 3,602,731

[72] Inventors: Hisayoshi Yanai, Tokyo; Fumio Hasegawa, Tokyo; Sugeta Takayuki, Tokyo; Nobuo Suzuki, Urawa, all of, Japan
[21] Appl. No.: 859,357
[22] Filed: Sept. 19, 1969
[45] Patented: Aug. 31, 1971
[73] Assignee: Nippon Electric Company Limited, Tokyo, Japan
[32] Priority: Sept. 20, 1968
[33] Japan
[31] 43/68494

[54] ACTIVE TRANSMISSION LINE
1 Claim, 2 Drawing Figs.
[52] U.S. Cl. .................................... 307/201, 317/234 V, 330/5, 331/107 G, 333/80 T
[51] Int. Cl. ........................................ H01p 3/00
[50] Field of Search .......................... 307/207; 331/107 G; 317/234

[56] References Cited
OTHER REFERENCES
Sugeta et al., " Proc. IEEE, " Feb. 1968, pp. 239–240, 307–201

Primary Examiner—Roy Lake
Assistant Examiner—Darwin R. Hostetter
Attorney—Sandoe, Hopgood and Calimafde ABSTRACT: An active transmission line simulating the operation of a nerve cell comprising a plurality of semiconductor elements each having the bulk negative resistance effect. Each element has a pair of mutually independent input and output terminals, one input terminal of one element being connected to one output terminal of the subsequent element. A signal applied to the center of the line is propagated in both directions and a signal applied at either end of the line is propagated toward the other end of the line.

PATENTED AUG 31 1971

3,602,731

INVENTORS
HISAYOSHI YANAI
FUMIO HASEGAWA
TAKAYUKI SUGETA
NOBUO SUZUKI

BY
*Sandoe, Hopgood and Calimafde*
ATTORNEYS

ACTIVE TRANSMISSION LINE

This invention relates to an active transmission line which is similar to the neural on and capable of nondistorted transmission.

BACKGROUND OF THE INVENTION

The nerve fiber which transmits signals from one nerve cell to another is an active line in which the signals are not attenuated and differs from the ordinary transmission line. The nerve fiber has a static energy source and an active element in the form of a spatial distribution, in which the active element converts the static energy into a dynamic energy. This active line has an inherent pulse waveform. Any waveform smaller than this inherent waveform is amplified during transmission, and any larger waveform is attenuated asymptotically to said inherent waveform. The nerve tissue may thus be considered as an ideal transmission line having a waveform-shaping function.

Several attempts have been made in the past to realize a transmission line equivalent to the nerve fiber. For example, H. D. Crane proposed the conception of the neuristor in "Proceedings of the IRE," Oct. 1962, pages 2,048 to 2,060. Some neuristor lines have been realized to embody this conception. For example, a transmission line associating Esaki diodes in a periodic arrangement has been proposed by Hayasaka and Nishizawa in "Journal of institute of Electronics and Communication Engineers of Japan," Aug. 1966, pages 1,529 to 1,537. Also, Sugeta, Ikoma and Yanai have jointly reported about a bulk neuristor element in "Proceeding of the IEEE," Feb. 1968, pages 239 to 240, which is formed by adding a plurality of input and output means to a semiconducting material to bring about a propagating high field domain attributed to the bulk negative resistance effect. In comparison with the neuristor using an Esaki diode, the bulk neuristor element, utilizing the propagating high field domain which is attributed to the bulk negative resistance effect, is advantageous in view of the fact that the element is structurally simple and its operating speed is high. A bulk neuristor element utilizing a bulk negative resistance effect has been already proposed by Sugeta et al. in the previously mentioned publication. But in order to realize an active transmission line substantially similar to the nerve fiber in its function by the use of the already-proposed bulk neuristor elements, the usage of many elements is required and the circuit is very complicated.

It is, therefore, a principal object of this invention to provide an active transmission line which is realized by a reduced number of elements, is simple in circuit design, and is similar to the nerve fiber in its function, by associating semiconductors which possess the bulk negative resistance effect.

BRIEF SUMMARY OF THE INVENTION

As described in the above-mentioned reports, the active transmission line is required to have: (1) the wave-shaping function, (2) the threshold action, (3) a constant pulse-propagating velocity, (4) a nonresponding period or a refractory period, and (5) bidirectionality. The requirements (1) through (4) can be satisfied by utilizing the propagating high field domain which is attributed to the bulk negative resistance effect, as described in "Electronic Material" of May 1967, pages 20 to 24. In the semiconductor element utilizing the propagating high field domain, an output signal appears only when the input signal exceeds the threshold level. The output signal is constant regardless of the value of the input signal. Moreover, the high field domain propagates from the cathode to the anode at a definite high velocity, and the element is nonresponsive to the input signal during the period when the propagating high field domain exists.

The transmission line of this invention comprises a plurality of semiconductor elements having said properties, each semiconductor element having mutually independent input and output means. The semiconductor elements are connected organically to each other through their input and output means, but the construction is not as complicated as that of a transmission line composed of S and T junctions of bulk neuristor elements. As a result, this transmission line has the property (5) mentioned above. In the transmission line of this invention, a signal applied to the center of the line is propagated in both directions, a signal from the right is propagated to the left, and a signal from the left is propagated to the right. The propagated signal is not reflected at the end of the line, and two signals propagated toward each other collide and disappear.

To the accomplishment of the above and such other objects as may hereinafter appear, the present invention relates to an active transmission line as defined in the appended claims, and as described in the following specification taken together with the accompanying drawing, in which:

FIG. 1 is a schematic diagram of a semiconductor active transmission line in a preferred embodiment according to the invention; and FIG. 2 is a voltage waveform diagram showing the operation of the transmission line of FIG. 1.

DETAILED DESCRIPTION OF THE INVENTION

Figure 1:
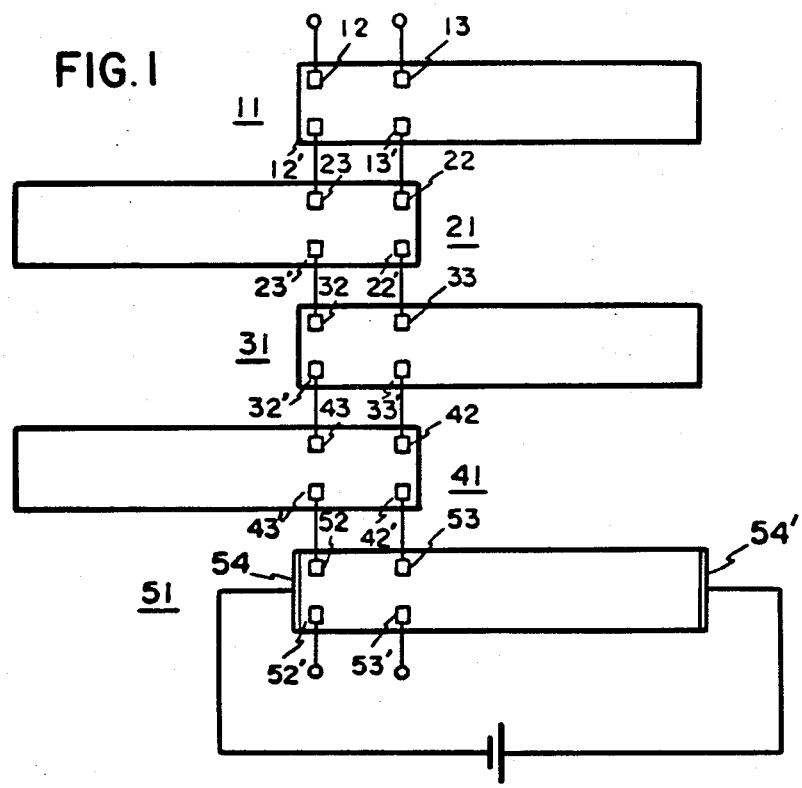

In FIG. 1, a plurality of semiconductor elements generally designated 11, 21, 31, 41 and 51 are composed of a suitable semiconductor material such as gallium arsenide or the like which has the bulk negative resistance effect. As typically shown by element 51, each element is provided with ohmic contacts (54 and 54') at both ends respectively, only those contacts for element 51 being shown in FIG. 1. The internal electric field of the semiconductor material is maintained above the sustaining field of the propagating high field domain and below the threshold field by the use of a power source $E_{51}$ connected across contacts 54 and 54'. The input terminal (for example, 52, 52') of each element is mounted near the cathode electrode (for example, 54) thereof. Each element, therefore, responds to the positive input pulse thereto, but does not respond to the negative input pulse. Since the electric field between the cathode electrode (54) and input terminal (52, 52') is strengthened by the positive input pulse applied to the element, the high field domain may be formed. The electric field between the anode electrode (54') and the input terminal (52, 52') is, however, not sufficiently strengthened by the negative input pulse applied to the element to form a high field domain, because the distance between the input terminal and the anode electrode is far greater than that between the input terminal and the cathode electrode.

Hereinafter, this invention will be explained in consideration that each element responds only to a positive input pulse.

Each of the semiconductor elements 11 through 51 is provided with pairs of signal input and output terminals 12, 12' and 13, 13'; ...; 52 and 52' and 53 and 53' respectively. As shown in FIG. 1, an output terminal of one element is connected to an input terminal of another element, and an input terminal of one element is connected to an output terminal of another element. The input terminal has a capacitive contact with the element, so that the potential at an output terminal of one element is given as an input to the subsequent element in a differentiated form.

Figure 2:
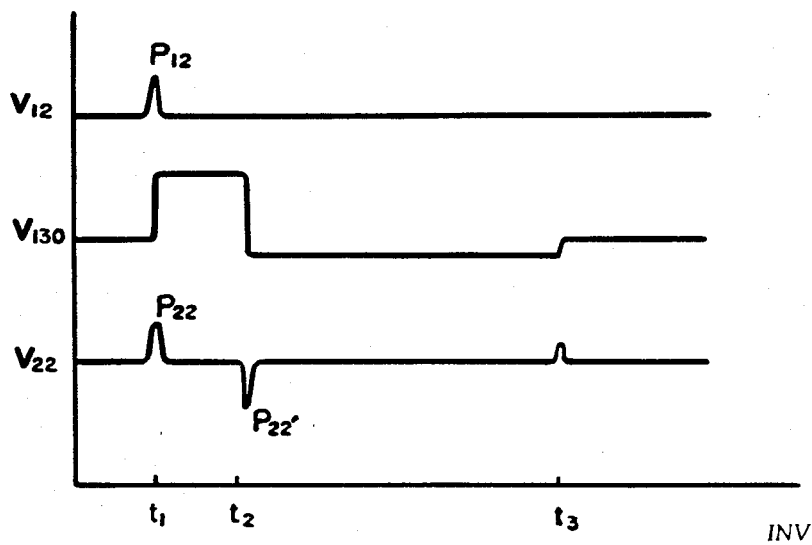

FIG. 2 illustrates the operation of the active transmission line shown in FIG. 1.

Assume that a pulse $P_{12}$ is applied to the input terminal 12 of semiconductor element 11 at a time $t_1$. This pulse causes a propagating high field domain to be formed in element 11, which high field domain propagates from one end (left hand in FIG. 1) to the other end (right hand in FIG. 1) of the element, so that the potential signal at output terminals 13 and 13' is varied as shown by $V_{130}$ as lapse of time. That potential signal is differentiated through the capacitive coupling at the input terminal of element 21 so that a positive pulse $P_{22}$ is applied to that input terminal at time $t_1$ and negative pulse is applied thereto at time $t_2$, when a high field domain passes through below the output terminals 13 and 13' of the element 11.

Since the high field domain is formed in the element 21 only by the positive pulse as mentioned above, a high field domain is formed in the semiconductor element 21 at time $t_1$, i.e., when a positive pulse $P_{22}$ comes in the element 11 but after the lapse of the time needed for the propagating high field domain to be formed and for the signal to reach the input terminal 22 from the output terminal 13'. Accordingly, the potential at the output terminals 23 and 23' is also varied as indicated by waveform $V_{130}$. The potential at the output terminal 23 is delivered to the input terminal 12' of the element 11 and to the input terminal 32 of the element 31 in the differentiated form. At this time, since the propagating high field domain, which has been formed in element 11 by input pulse $P_{12}$, is propagating in element 11, it is impossible for the input pulse at input terminal 12' to form a high field domain in element 11. At that time, there is no propagating high field domain in semiconductor element 31, and a propagating high field domain is formed in element 31 by the output pulse of element 21. As a result, the potentials as the output terminals 33 and 33' are varied as shown by $V_{130}$. Consequently the output signal of element 31 is conveyed in the differentiated waveform to semiconductor element 41 in which a high field domain does not yet exist. However, that signal is not conveyed to element 21 because there has been already formed and now exists in that element a propagating high field domain. The elements 41, 51 operate in a similar manner as the elements 11 through 31. In this manner, the input pulse applied to the input terminal 12 of this transmission line is propagated from the semiconductor element 11 to element 51 by way of elements 21, 31 and 41, and the pulse, after its waveform is shaped, comes out at the output terminal 53' at element 51. Similarly, when an input pulse is applied to the input terminal 52', the signal is propagated through the semiconductor elements 51, 41, ... 11, and delivered to the output terminal 13 of element 11.

Now assume that two signals are simultaneously applied to the transmission line; one signal from input terminal 12 on one end, and the other signal from input terminal 52' on the other end. The signal applied to input terminal 12 is propagated through elements 11 and 21 and sent to input terminal 32 of element 31. In the same manner, the signal which entered the input terminal 52' reaches the input terminal 32' of element 31. In element 31, only one high field domain is formed by both input signals at the input terminals 32 and 32'. Furthermore, if both input signals have a period therebetween, a high field domain is formed in element 31 by the first input signal so that it is not formed by the other input signal because a high field domain is already propagating in the element at the time the other input signal is applied to element 21. The output pulse of element 31 is propagated to the input terminals of elements 21 and 42 in which a high field domain is still present. Accordingly, high field domains cannot be formed in elements 21 and 41 in which a high field domain is still present. Accordingly, high field domains cannot be formed in elements 21 and 41 by the output pulse of element 31. Thus, the output pulse of element 31 cannot be transmitted to element 21 or to element 41, that is, the signals propagated respectively from both ends of the transmission line collide at element 31 and disappear. Needless to say, the two signals would disappear even if these signals were applied at both ends of the transmission line at slightly different times from each other.

Assume now that a signal is applied to element 31 which is in the middle of the transmission line. As in the foregoing case, the output of element 31 is propagated to the input terminals 22' and 42 of elements 21 and 41 respectively. In this case, there is no propagating high field domain in elements 21 and 41 so that the propagating high field domains can be formed by the input signal applied thereto, and thus, output signals are produced by element 21 and element 41. These output signals are then simultaneously propagated respectively in the direction of elements 11 and 51. In other words, the signal applied to the middle of the transmission line is branched so as to be propagated in two directions after receiving waveform shaping, without being attenuated.

In the foregoing description, consideration is not given to the time needed for the signal to be propagated from the output terminal of one semiconductor element to the input terminal of the subsequent element. However, it is necessary for the propagation of the signal that the length of the semiconductor material be sufficiently long and the propagating time of the high field domain be more than twice the time required for the signal to be propagated from the output terminal of one element to the input terminal of the subsequent element. In other words, it is necessary that the length of the propagating region of the propagating high field domain in the element be longer than the product of the propagating speed of the high field domain and the time required for the signal to go out from an element and to return to the same element by way of the input and output linkage defined by the input and output terminals interconnecting the various semiconductor elements. If that is not so, the signal output from the one element (for example, output pulse $P_{22}$ from the element 11) returns to the same element (for example, input pulse $P_{22}$, to the element 11), and generates the high field domain in that element. Namely, the signal remains in the one element. In the embodiment described, five semiconductor elements are used, but the number of semiconductor elements is not confined to five; more than two elements may be used in correspondency to the length of the desired transmission line. Also, in the embodiment specifically shown, only a capacitive input terminal is employed for an input terminal, but an ohmic terminal or a terminal based on a PN junction or a Schottky barrier may be employed, provided that the output potential of one stage is differentiated by the coupling line or other suitable means and then applied as an input to the subsequent state.

It will thus be understood that variations to the specifically disclosed embodiment may be made without departing from the spirit and scope of the invention.

We claim:

1. An active transmission line comprising a plurality of semiconductor elements each of which has the capability of producing a propagating high field domain attributable to the bulk negative resistance effect, each of said plurality of elements having mutually independent first and second input terminals and first and second output terminals, and means for coupling one of the input and output terminals of one of said elements to one of the output and input terminals of another element respectively, to thereby establish an input and output linkage between said semiconductor elements, said input terminals including means for differentiating the signal at the output terminal of the preceding one of said elements, said coupling means including means for applying said differentiated signal to the input terminal of the next one of said elements, the length of the propagating region of the high field domain in each of said semiconductor elements being greater than the product of the propagating speed of the high field domain and the time required for a signal to go out from one of said elements and to return to said one element by way of said input and output linkage.